Feb. 14, 1956 J. A. LARCÉN 2,734,723
DRILL RIGS OR DRILL SUPPORTING APPARATUS
Filed July 3, 1951 5 Sheets-Sheet 1

INVENTOR
Jan August Larcén
BY
his Attorney

Feb. 14, 1956 J. A. LARCÉN 2,734,723
DRILL RIGS OR DRILL SUPPORTING APPARATUS
Filed July 3, 1951 5 Sheets-Sheet 2

INVENTOR.
Jan August Larcén
BY Jarvis Marble
his Attorney

Feb. 14, 1956   J. A. LARCÉN   2,734,723
DRILL RIGS OR DRILL SUPPORTING APPARATUS
Filed July 3, 1951   5 Sheets-Sheet 3

INVENTOR.
Jan August Larcén
BY Jarvis M Markle
His Attorney

Feb. 14, 1956  J. A. LARCÉN  2,734,723
DRILL RIGS OR DRILL SUPPORTING APPARATUS
Filed July 3, 1951  5 Sheets-Sheet 4

Feb. 14, 1956   J. A. LARCÉN   2,734,723
DRILL RIGS OR DRILL SUPPORTING APPARATUS
Filed July 3, 1951   5 Sheets-Sheet 5

INVENTOR.
Jan August Larcén
BY Jarvis C Marble
his Attorney

United States Patent Office 2,734,723
Patented Feb. 14, 1956

2,734,723

DRILL RIGS OR DRILL SUPPORTING APPARATUS

Jan August Larcén, Stockholm, Sweden, assignor to Aktiebolaget Atlas Diesel, Nacka, Sweden, a corporation of Sweden Application July 3, 1951, Serial No. 234,934

Claims priority, application Sweden July 3, 1950

13 Claims. (Cl. 255—51)

This invention relates to drill rigs or drill supporting apparatus for rock drills. One object of the invention is to make possible a rapid drilling of a group or groups of drill holes in a tunnel face, a mine or the like. A further object of the invention is to provide a drill supporting apparatus by means of which the driller is relieved from the heavy work of handling the drills and drill feed bars or cradles. A still further object of the invention is to provide an apparatus by means of which one man may operate two or more drills simultaneously. For these and other purposes I provide a drill rig or drill supporting apparatus comprising a substructure, at least two feed bars or cradles mounted to swing on said substructure and arranged for feeding rock drills, means on the substructure for swinging said feed bars or cradles on the substructure, and maneuvering means for the feeding motion and for the swinging of the feed bars or cradles spaced from the feed bars or cradles.

Figure 2:
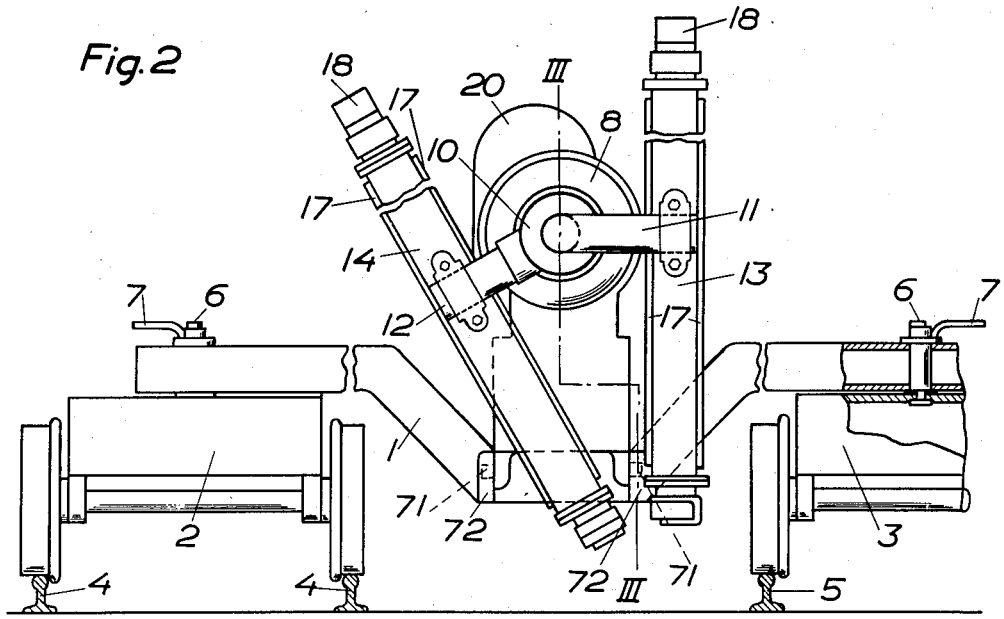
Figure 1:
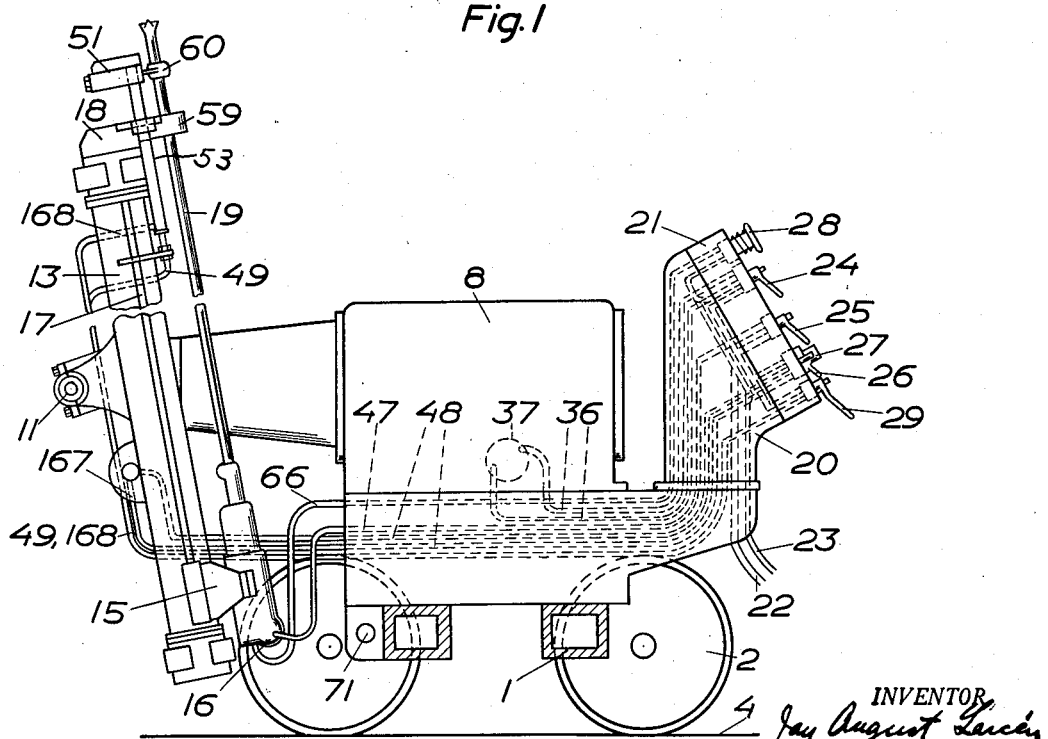
Figure 4:
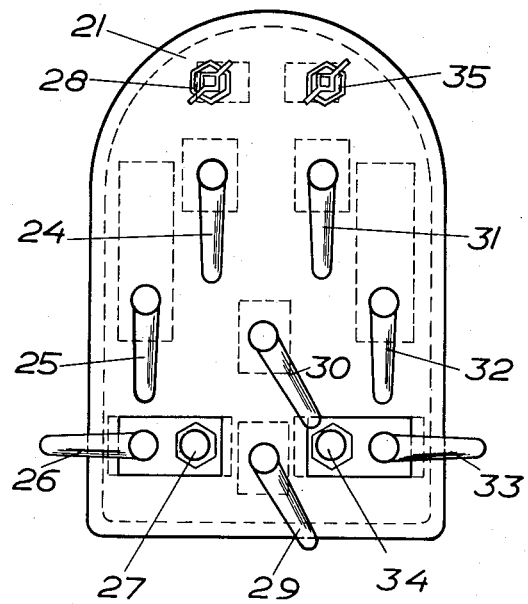
Figure 3:
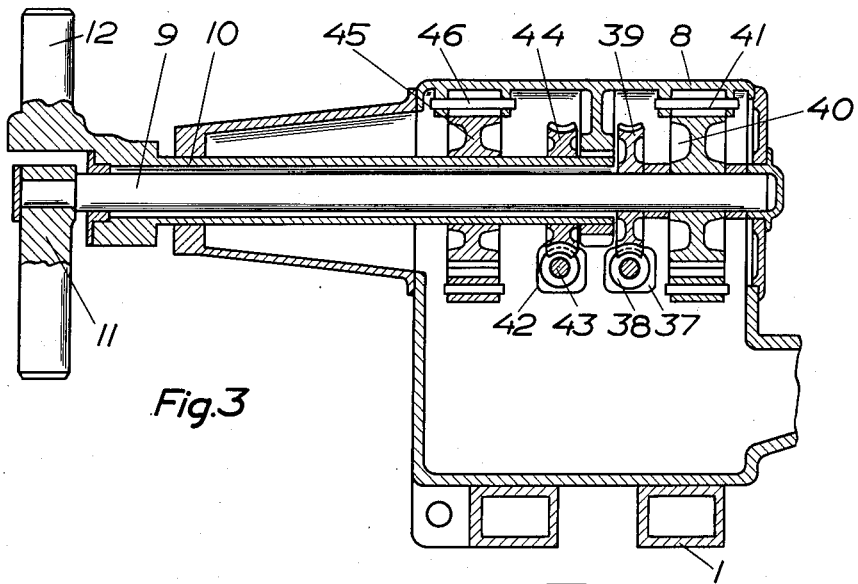
Figure 8:
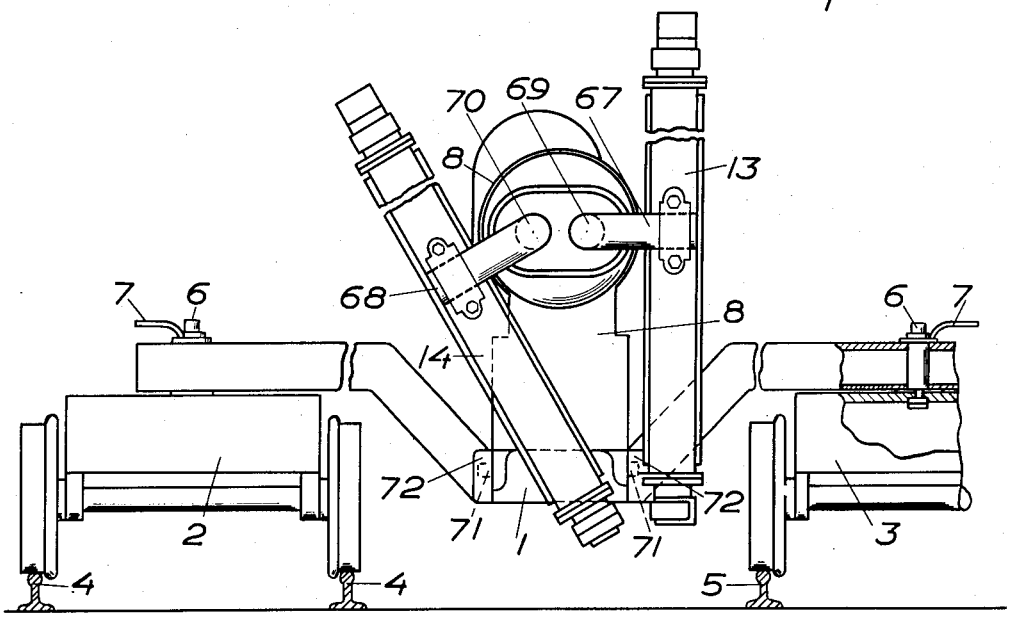
Figure 9:
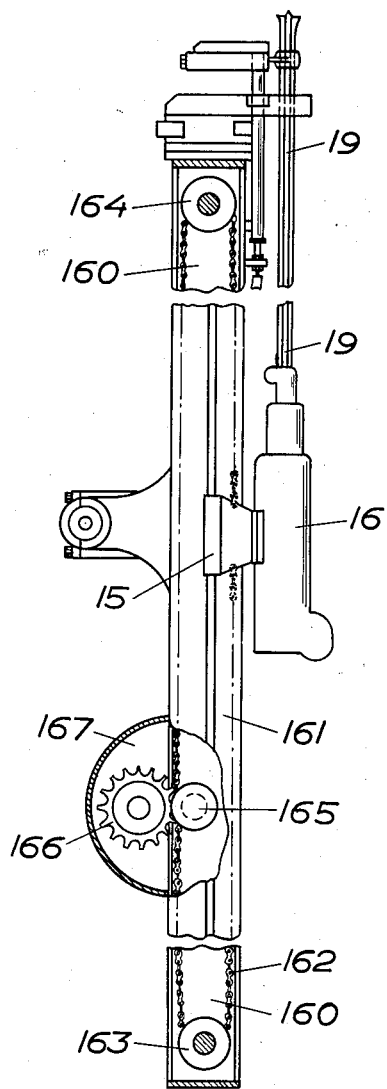
Figure 6:
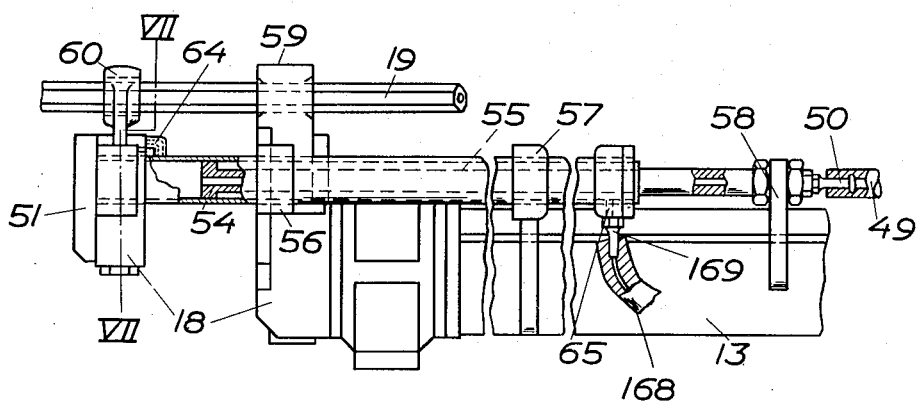
Figure 7:
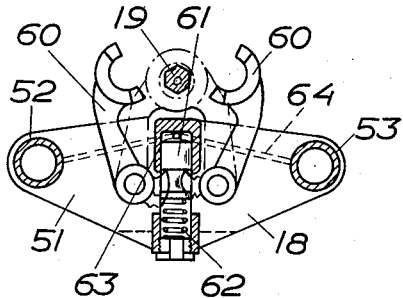

In the accompanying drawings two embodiments of drill rigs or drill supporting apparatus according to the invention are illustrated by way of example. Fig. 1 is a side view and partial section of an apparatus for drilling groups of holes in fan shape in rock and having two feed bars swingable on horizontal coaxial shafts and having the feed bars, the drills, guides for the drill rods, and the swinging mechanism for the feed bars maneuvered from one centrally arranged maneuvering place. Fig. 2 is a front view partially broken away of the drill ring according to Fig. 1. Fig. 3 is a section substantially on line III—III in Fig. 2. Fig. 4 is a rear view and Fig. 5 a side view of the maneuevering mechanism of the drill rig according to Figs. 1–3 on a somewhat larger scale than said figures. Fig. 6 illustrates also on a somewhat larger scale a partially broken side view of one of the feed bars. Fig. 7 is a section on line VII—VII in Fig. 6, and Fig. 8 is a front view of a modified embodiment of the drill rig or apparatus according to Figs. 1–7 in which two feed bars or cradles are mounted to swing on horizontal parallel shafts. Fig. 9 illustrates a feed bar in side elevation and partly in section.

The drill rig according to Figs. 1–7 and 9 comprises a substructure which among other elements includes a framework 1, two trolleys 2 and 3, respectively, on which the framework 1 is mounted and one of which is broken away in Fig. 1 and which run on parallel tracks formed by rails 4, 4 and 5, 5, respectively. The framework 1 is mounted to turn on bolts 6 on the trolleys 2, 3 and may be locked to the trolleys by means of large wing nuts 7, as is obvious from Fig. 2. When the drill rig according to Figs. 1–7 moved over long distances the wing nuts 7 are loosened and the framework 1 is swung longitudinally of the tracks and the trolleys are carried over to a single track so that they run one after the other. It is thus possible to move the drill rig in a simple manner on a single track along comparatively narrow and winding transport roads.

The substructure carries a housing 8 mounted on the framework 1. Two heavy horizontal shafts 9 and 10 are rotatably journalled in the housing. The housing 8, however, may according to prevailing conditions be designed in such a manner that the shafts 9 and 10 are inclined or vertical. The shafts 9 and 10 are mounted coaxially, the shaft 10 comprising a tubular shaft through which the shaft 9 extends. The ends of the shafts 9 and 10 project forwardly from the housing 8 and the prejecting ends carry transverse arms or cross bars 11 and 12, respectively, on the free ends of which feed bars or cradles 13 and 14 are secured substantially perpendicular to the transverse arms 11, 12 and in such a manner that the feed bars upon turning of the shafts 9, 10 move over a surface forming an angle with a vertical plane perpendicular to the shafts. In Fig. 1 one of the feed bars only is illustrated in order to make said figure less congested. In the drill rig according to Figs. 1–7 each feed bar moves over a slightly conical surface.

Each feed bar 13, 14 is provided with a bracket 15 for a rock drill 16 movable on guide rails 17 on the feed bar. The means for moving the drills along the feed bars may comprise pressure fluid actuated pistons, motor driven screws or chains, or other means well known in connection with feed bars or cradles for rock drills. A suitable design is illustrated in Fig. 9 and comprises a chain feed bar including two channels 160, 161 between which a chain 162 connected to the drill and carried over rollers 163 and 164 is mounted. The chain 162 is furthermore carried between a roller 165 and a driving sprocket 166 driven by a reversible compressed air motor 167. At the free ends of the feed bars guiding means 18 for a drill rod 19 are provided for guiding the free end of the drill rod 19 adjacent the rock face. The guiding means is illustrated in detail in Figs. 6 and 7 and described hereinbelow.

Figure 5:
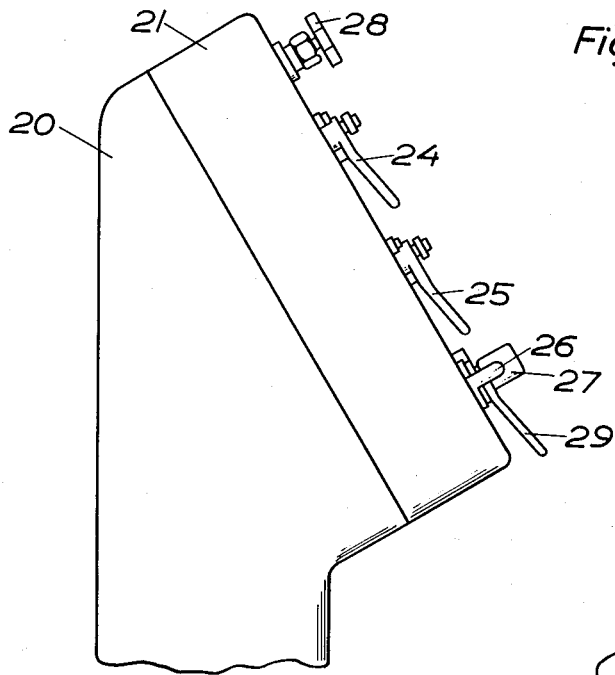

At the rear portion of the housing 8 a housing 20 is provided which carries a maneuvering casing 21, illustrated on a larger scale in Figs. 4 and 5. In this casing are concentrated the maneuvering means for feeding and retracting the drills on the feed bars, for adjusting the feed pressure of the feeding mechanism, for starting and stopping the drills, for controlling the flushing medium supply, for operating the drill rod guiding means and for turning of the shafts 9, 10 carrying the feed bars. A hose 22 supplies compressed air to the maneuvering casing 21 and the valve mechanisms provided therein, and a hose 23 supplies flushing water to the maneuvering casing. A number of valves are disposed in the maneuvering casing 21, said valves, however, are not illustrated in detail since they may be conventional valves well known in the art. The actuating means for said valves are designated by the numerals 24–35 in Figs. 1, 4 and 5, respectively.

The handle 24 controls the supply of compressed air from the conduit 22 to two conduits 36 leading to a reversible compressed air driven motor 37 provided in the housing 8 which motor by means of an irreversible worm 38 drives a worm wheel 39 secured on the turning shaft 9. Upon turning of the handle 24 to the right and to the left the operator may operate the motor 37 forward or reverse for swinging the feed bar 13 to the right or to the left, respectively. Due to the fact that the worm wheel drive 38, 39 is irreversible the feed bar always stops in the position taken when the air supply to the motor 37 is interrupted. In order to further hold the shaft 9 in a desired position a brake drum 40 is secured to the shaft 9 which brake drum may be held fixed by means of a brake band 41 disposed in the housing 8 and diagrammatically illustrated in Fig. 3. The brake band may be operated by means of a mechanically or pneumatically operated mechanism of a type which is conventional in brakes and which therefore is not described in detail here. In similar manner as the feed bar 13 the feed bar 14 is operated by means of the handle 31 which controls the air supply from the conduit 22 to a reversible compressed air motor 42, Fig. 3, which by means of an irreversible worm 43 drives a worm wheel 44 secured to the turning shaft 10 for the feed bar 14. The turning shaft 10 carries a brake drum 45 which may be held fixed by means of a suitable brake band 46.

The handle 25 is provided for controlling the compressed air supply from the conduit 22 to a conduit 47 which leads to the rock drill 16 and supplies the compressed air necessary for operating said drill. The drill may naturally be of any type, for instance a hammer drill or a drill for rotary drilling according to the prevailing conditions. The handle 26 is provided for controlling the supply of compressed air from the conduit 22 to two conduits 48 leading to the feed bar 13 and the reversible motor 167 for feeding and retracting the drill 16 on the feed bar or cradle 13. The handle 27 serves to adjust the pressure in one of the conduits 48 to a value suitable for feeding the drill. In similar manner handles 33, 34 are provided for controlling and adjusting the compressed air supply to the feed bar 14 and by means of the handles 26, 27 and 33, 34, respectively, the operator may feed the drills 16 on the feed bars and retract them when drilling is finished. The handles 29, 30 control the compressed air supply from the conduit 22 to two conduits 49 and 168 leading to the drill rod guiding mechanism 18 to which they are connected at 50 and 169, Fig. 6.

The drill rod guiding mechanism 18 consists of a slide comprising a crosshead 51 and two tubular members 52, 53 forming cylinders parallel with the drill rod 19 and movable on hollow pistons 54 carried by hollow piston rods 55 parallel with the drill rod 19. The tubular members 52, 53 are reciprocable in bearings 56, 57 on the feed bar 13 and the piston rods 55 are secured in brackets 58 on the feed bar 13. The drill rod 19 is guided in guiding means 59 on the feed bar, and, furthermore, in reciprocable guiding means 60 on the crosshead 51. The guiding means 59, 60 comprise pairs of levers which may be swung apart for inserting the drill rod and again closed on the drill rod through the action of a piston 61 which against the action of a spring 62 is movable in a cylinder 63. The levers 59, 60 at their free ends form semi-circular jaws which in closed position of the guiding means grasp the drill rod 19 and form guiding sleeves for the drill rod. Compressed air supplied through the conduit 49 is conveyed into the tubular members 52, 53 and therefrom through a conduit 64 to the cylinder 63, the piston 61 of which co-acts with the pair of levers 60 so that the guiding means are closed. The pair of levers 59 are arranged in similar manner. Simultaneously with closing of the guiding means the cross head 51 is moved longitudinally of the drill rod until it reaches the rock face or is stopped by an abutment 65 which may abut the bearing 57.

Obviously the operator by manipulating the handles 29, 30 may supply air to the cylinders 53 in front of pistons 54 to cause the guiding means to close on the drill rod 19 and to move towards the rock face. When the supply of compressed air is interrupted the spring 62 separates the guiding means 59, 60. By manipulating the handles the operator may also supply air through pipe connection 169 to the rear end of pistons 54 and simultaneously vent the opposite side so that the drill rod guide is retracted.

The valve 28 provided on the maneuvering casing 21 controls the supply of flushing water from the conduit 23 to a conduit 66 which conveys the flushing water to the drill 16. In the same manner the valve 35 controls the supply of flushing water to the drill movable on the feed bar 14.

The feed bar 14 is equipped in the same manner as the feed bar 13 but the conduits to the feed bar 14 have not been shown in the drawing in order to avoid congestion. The conduits 47, 48, 49, 66 to each feed bar may preferably be held together as a bundle of hoses by suitable clamping strips. It may sometimes be suitable to provide a greater number of feed bars than the two illustrated on the transverse arms 11, 12, and it is also possible to provide more than two coaxial swinging shafts for the feed bars which may move in paths parallel to the paths of the feed bars 13, 14 and which may be situated at a suitable distance therefrom in the travelling direction of the drill rig.

It is obvious from the preceding description that the operator by means of the levers or handles provided on the maneuvering casing 21 may swing the feed bars 13, 14 into any desired angular position, feed and retract the drills on the feed bars, operate the drills and control the flushing medium supply and operate the drill rod guiding means, all while the operator remains at the same place which is spaced from the feed bars and the drills. In this way the operator has a perfect view so that he may accurately follow the work of the drills. During these operations the operator does not have to move away from the maneuvering casing.

The embodiment of the invention illustrated in Fig. 8 is a modification of the drill rig according to Figs. 1–7 and differs from said embodiment only in that the feed bars 13, 14 according to Fig. 8 are secured on arms 67, 68 which are provided on shafts 69, 70 disposed in parallel in the housing 8. The rest of the drill rig is similar to the drill rig according to Figs. 1–7, and the same reference numerals have therefore been used to indicate equivalent parts which are not described again.

The housing 8 in which the shafts 69, 70 are mounted is provided at its lower portion with two horizontal trunnions 71, 71 mounted in bearings 72, 72 on the framework 1 so that the housing 8 and the shafts 69, 70 may be dumped thereby causing the working field or the paths of the feed bars to take another angle relative to a vertical plane perpendicular to the direction of travel of the drill rig. By means of a worm and worm wheel mechanism or the like not illustrated the housing 8 may be swung on the trunnions and locked in different positions.

The embodiments of the invention above described and illustrated in the drawings should be considered only as examples and the details of the invention may be modified in several different ways within the scope of the claims. In the illustrated embodiments compressed air driven motors 37, 42 for swinging the feed bars have been illustrated. However, within the scope of the invention such motors may be replaced by hydraulic motors driven by a suitable pressure liquid and the controlling means for the motors and the conduits to and from said motors are then arranged for controlling and supplying pressure liquid from a pump or other source of pressure liquid. The motors may also be electric motors.

What I claim is:

1. A drill rig comprising a sub-structure, a housing mounted on said sub-structure, a pair of concentric shafts rotatably mounted in said housing and extending therefrom, reversible motors mounted in said housing for independently driving said shafts in either direction, brake means in said housing for locking either shaft in adjusted position, a feed bar mounted on the extending end of each shaft, a drill motor and drill rod reciprocably carried by each feed bar, feeding means for each drill motor and drill rod, drill rod guiding means mounted on each feed bar and comprising a first pair of guide jaws pivotally mounted on said feed bar for movement into and out of engagement with said drill rod, fluid pressure means for moving said guide jaws into engagement with said drill rod and resilient means for moving said guide jaws out of engagement with said drill rod, a cross-head, spaced parallel cylinders fixed to said cross-head and slidably received in bearings on said feed bar, spaced parallel pistons fixed to said feed bar and slidably received in said cylinders, a second pair of guide jaws pivotally mounted on said cross-head for movement into and out of engagement with said drill rod, fluid pressure means for moving said second guide jaws into engagement with said drill rod and resilient means for moving said second guide jaws out of engagement with said drill rod, means for introducing fluid pressure to said cylinders to move said second guide jaws away from and toward said first guide jaws to support and guide said drill rod in accordance with the extended length thereof, a control panel mounted on said substructure and control means on said panel for controlling the operation of said reversible motors, said brake means, said drill motors, said feed bars, the engagement and disengagement of said guide jaws with said drill rod and the movement of said second guide jaws away from and toward said first guide jaws whereby all drilling operations may be controlled from a single location.

2. A drill rig comprising a sub-structure, a housing mounted on said sub-structure, a pair of shafts rotatably mounted in said housing and extending therefrom, reversible motors mounted in said housing for independently driving said shafts in either direction, brake means in said housing for locking either shaft in adjusted position, a feed bar mounted on the extending end of each shaft, a drill motor and drill rod reciprocably carried by each feed bar, feeding means for each drill motor and drill rod, drill rod guiding means mounted on each feed bar and comprising a first pair of guide jaws pivotally mounted on said feed bar for movement into and out of engagement with said drill rod, fluid pressure means for moving said guide jaws into engagement with said drill rod and resilient means for moving said guide jaws out of engagement with said drill rod, a cross-head, spaced parallel cylinders fixed to said cross-head and slidably received in bearings on said feed bar, spaced parallel pistons fixed to said feed bar and slidably received in said cylinders, a second pair of guide jaws pivotally mounted on said cross-head for movement into and out of engagement with said drill rod, fluid pressure means for moving said second guide jaws into engagement with said drill rod and resilient means for moving said second guide jaws out of engagement with said drill rod, means for introducing fluid pressure to said cylinders to move said second guide jaws away from and toward said first guide jaws to support and guide said drill rod in accordance with the extended length thereof, a control panel mounted on said sub-structure and control means on said panel for controlling the operation of said reversible motors, said brake means, said drill motors, said feed bars, the engagement and disengagement of said guide jaws with said drill rod and the movement of said second guide jaws away from and toward said first guide jaws whereby all drilling operations may be controlled from a single location.

3. A drill rig comprising a sub-structure, a pair of shafts rotatably mounted on said sub-structure, reversible motors for independently driving said shafts in either direction, means for locking either shaft in adjusted position, a feed bar mounted on each shaft, a drill motor and drill rod reciprocably carried by each feed bar, feeding means for each drill motor and drill rod, drill rod guiding means mounted on each feed bar and comprising a first pair of guide jaws pivotally mounted on said feed bar for movement into and out of engagement with said drill rod, fluid pressure means for moving said guide jaws into engagement with said drill rod and resilient means for moving said guide jaws out of engagement with said drill rod, a cross-head, spaced parallel cylinders fixed to said cross-head and slidably received in bearings on said feed bar, spaced parallel pistons fixed to said feed bar and slidably received in said cylinders, a second pair of guide jaws pivotally mounted on said cross-head for movement into and out of engagement with said drill rod, fluid pressure means for moving said second guide jaws into engagement with said drill rod and resilient means for moving said second guide jaws out of engagement with said drill rod, means for introducing fluid pressure to said cylinders to move said second guide jaws away from and toward said first guide jaws to support and guide said drill rod in accordance with the extended length thereof, a control panel mounted on said sub-structure and control means on said panel for controlling the operation of said reversible motors, said locking means, said drill motors, said feed bars, the engagement and disengagement of said guide jaws with said drill rod and the movement of said second guide jaws away from and toward said first guide jaws whereby all drilling operations may be controlled from a single location.

4. A drill rig comprising a sub-structure, a pair of shafts rotatably mounted on said sub-structure, reversible motors for independently driving said shafts in either direction, a feed bar mounted on each shaft, a drill motor and drill rod reciprocably carried by each feed bar, feeding means for each drill motor and drill rod, drill rod guiding means mounted on each feed bar and comprising a first pair of guide jaws mounted on said feed bar for movement into and out of engagement with said drill rod, fluid pressure means for moving said guide jaws into engagement with said drill rod and resilient means for moving said guide jaws out of engagement with said drill rod, a cross-head, a cylinder fixed to said cross-head and slidably received in bearings on said feed bar, a piston fixed to said feed bar and slidably received in said cylinder, a second pair of guide jaws mounted on said cross-head for movement into and out of engagement with said drill rod, fluid pressure means for moving said second guide jaws into engagement with said drill rod, and resilient means for moving said second guide jaws out of engagement with said drill rod, means for introducing fluid pressure to said cylinder to move said second guide jaws away from and toward said first guide jaws to support and guide said drill rod in accordance with the extended length thereof, a control panel mounted on said sub-structure and control means on said panel for controlling the operation of said reversible motors, said drill motors, said feed bars, the engagement and disengagement of said guide jaws with said drill rod, and the movement of said second guide jaws away from and toward said first guide jaws whereby all drilling operations may be controlled from a single location.

5. A drill rig comprising a sub-structure, a shaft rotatably mounted on said sub-structure, a reversible motor for driving said shaft in either direction, a feed bar mounted on said shaft, a drill motor and drill rod reciprocably carried by said feed bar, feeding means for said drill motor and drill rod, drill rod guiding means mounted on said feed bar and comprising a first pair of guide jaws mounted on said feed bar for movement into and out of engagement with said drill rod, fluid pressure means for moving said guide jaws into engagement with said drill rod and resilient means for moving said guide jaws out of engagement with said drill rod, a cross-head, a cylinder fixed to said cross-head and slidably received in bearings on said feed bar, a piston fixed to said feed bar and slidably received in said cylinder, a second pair of guide jaws mounted on said cross-head for movement into and out of engagement with said drill rod, fluid pressure means for moving said second guide jaws into engagement with said drill rod and resilient means for moving said second guide jaws out of engagement with said drill rod, means for introducing fluid pressure to said cylinder to move said second guide jaws away from and toward said first guide jaws to support and guide said drill rod in accordance with the extended length thereof, a control panel mounted on said sub-structure and control means on said panel for controlling the operation of said reversible motor, said drill motor, said feed bar, the engagement and disengagement of said guide jaws with said drill rod and the movement of said second guide jaws away from and toward said first guide jaws whereby all drilling operations may be controlled from a single location.

6. A drill rig comprising a sub-structure, a shaft rotatably mounted on said sub-structure, a reversible motor for driving said shaft in either direction, a feed bar mounted on said shaft, a drill motor and drill rod reciprocably carried by said feed bar, feeding means for said drill motor and drill rod, drill rod guiding means mounted on said feed bar and comprising a first pair of guide jaws, means for moving said guide jaws into and out of engagement with said drill rod, a cross-head, a cylinder fixed to said cross-head and slidably received in bearings on said feed bar, a piston fixed to said feed bar and slidably received in said cylinder, a second pair of guide jaws mounted on said cross-head, means for moving said second guide jaws into and out of engagement with said drill rod, means for introducing fluid pressure to said cylinder to move said second guide jaws away from and toward said first guide jaws to support and guide said drill rod in accordance with the extended length thereof, a control panel mounted on said sub-structure and control means on said panel whereby all drilling operations may be controlled from a single location.

7. A drill rig comprising a sub-structure, a shaft rotatably mounted on said sub-structure, a reversible motor for driving said shaft in either direction, a feed bar mounted on said shaft, a drill motor and drill rod reciprocably carried by said feed bar, feeding means for said drill motor and drill rod, drill rod guiding means mounted on said feed bar, means for moving said guide means into and out of engagement with said drill rod, a cross-head, a cylinder fixed to said cross-head and slidably received in bearings on said feed bar, a piston fixed to said feed bar and slidably received in said cylinder, a second guide means mounted on said cross-head, means for moving said second guide means into and out of engagement with said drill rod, means for introducing fluid pressure to said cylinder to move said second guide means away from and toward said first guide means to support and guide said drill rod in accordance with the extended length thereof, a control panel mounted on said sub-structure and control means on said panel whereby all drilling operations may be controlled from a single location.

8. A drill rig comprising a sub-structure, a shaft rotatably mounted on said sub-structure, a reversible motor for driving said shaft in either direction, a feed bar mounted on said shaft, a drill motor and drill rod reciprocably carried by said feed bar, feeding means for said drill motor and drill rod, drill rod guiding means mounted on said feed bar, means for moving said guide means into and out of engagement with said drill rod, a cross-head slidably mounted on said feed bar, a second guide means mounted on said cross-head, means for moving said second guide means into and out of engagement with said drill rod, means for moving said second guide means away from and toward said first guide means to support and guide said drill rod in accordance with the extended length thereof, and control means grouped at a single location on said sub-structure whereby all drilling operations may be controlled from a single location.

9. A drill rig comprising a sub-structure, a shaft rotatably mounted on said sub-structure, a reversible motor for driving said shaft in either direction, a feed bar mounted on said shaft, a drill motor and drill rod reciprocably carried by said feed bar, feeding means for said drill motor and drill rod, drill rod guiding means mounted on said feed bar, a cross-head slidably mounted on said feed bar, a second guide means mounted on said cross-head, means for moving said second guide means away from and toward said first guide means to support and guide said drill rod in accordance with the extended length thereof, a control panel mounted on said sub-structure and control means on said panel whereby all drilling operations may be controlled from a single location.

10. A drill rig comprising a sub-structure, a housing mounted on said sub-structure, a substantially horizontal shaft mounted in said housing and extending therefrom, power means for rotating said shaft in either direction, a cross bar mounted on the extending end of said shaft substantially transversely to the shaft, a feed bar mounted on said cross bar substantially perpendicular to said shaft and swingable in fan shape upon rotation of said shaft, a drill motor and drill rod reciprocably carried by said feed bar, feeding means for said drill motor and drill rod, extensible and retractible drill rod guiding means mounted on said feed bar capable of engaging said drill rod to guide the rod and of disengaging the rod, respectively, and controlling means grouped at a single location on said housing for controlling the operation of said shaft rotating means, said feeding means, said drill motor, and said drill rod guiding means.

11. A drill rig comprising a sub-structure, a housing mounted on said sub-structure, a substantially horizontal shaft mounted in said housing and extending therefrom, power means for rotating said shaft in either direction, means for holding the shaft fixed in various positions of rotation, a feed bar mounted on the shaft to extend substantially perpendicular to the shaft, and swingable in fan shape upon rotation of the shaft, a drill motor and drill rod reciprocably carried by said feed bar, feeding means for said drill motor and drill rod, extensible and retractable drill rod guiding means mounted on the feed bar capable of engaging said drill rod to guide the rod and of disengaging the rod, respectively, and controlling means grouped at a single location on said housing for controlling the operation of said shaft rotating means, said holding means, said feeding means, said drill motor, and said drill rod guiding means.

12. A drill rig comprising a sub-structure, a housing mounted on said sub-structure, a pair of substantially horizontal concentric shafts rotatably mounted in said housing and extending therefrom, power means for rotating said shafts in either direction, means for locking either shaft in adjusted position, a cross bar mounted on the extending end of each shaft substantially transversely to the shaft, feed bars mounted on said cross bars substantially perpendicular to said shaft and swingable in fan shape upon rotation of said shafts, a drill motor and drill rod reciprocably carried by said feed bar, feeding means for said drill motor and drill rod, extensible and retractable drill rod guiding means mounted on said feed bar and capable of engaging said drill rod to guide the rod and of disengaging the rod, respectively, and controlling means grouped at a single location on said housing for controlling the operation of said shaft rotating means, said locking means, said feeding means, said drill motor, and said drill rod guiding means.

13. A drill rig comprising a sub-structure, a housing mounted on said sub-structure, a pair of substantially horizontal parallel shafts rotatably mounted in said housing and extending therefrom, power means for rotating said shafts in either direction, means for locking either shaft in adjusted position, a cross bar mounted on the extending end of each shaft substantially transversely to the shaft, feed bars mounted on said cross bar substantially perpendicular to said shaft and swingable in fan shape upon rotation of said shafts, a drill motor and drill rod reciprocably carried by said feed bar, feeding means for said drill motor and drill rod, extensible and retractible drill rod guiding means mounted on said feed bar and capable of engaging said drill rod to guide the rod and of disengaging the rod, respectively, and controlling means grouped at a single location on said housing for controlling the operation of said shaft rotating means, said locking means, said feeding means, said drill motor, and said drill rod guiding means.

(References on following page)

References Cited in the file of this patent

UNITED STATES PATENTS

| | | |
|---|---|---|
| 1,113,531 | Ball | Oct. 13, 1914 |
| 1,604,896 | Foltz | Oct. 26, 1926 |
| 1,632,400 | Gilman | June 14, 1927 |
| 1,978,368 | Levin | Oct. 23, 1934 |
| 1,984,373 | Holmes | Dec. 18, 1934 |
| 2,055,520 | Curtis | Sept. 29, 1936 |
| 2,214,789 | Fuehrer | Sept. 17, 1940 |
| 2,334,009 | Jeffrey | Nov. 9, 1943 |
| 2,500,931 | Curtis | Mar. 21, 1950 |
| 2,512,497 | Lee | June 20, 1950 |

FOREIGN PATENTS

| | | |
|---|---|---|
| 500,865 | Belgium | Feb. 15, 1951 |